G. F. MILES.
WIND AND RAIN SHIELD.
APPLICATION FILED OCT. 28, 1920.

1,416,112. Patented May 16, 1922.

Attest:

Inventor:
George F. Miles
by Mitchell & Allyn
Attys

UNITED STATES PATENT OFFICE.

GEORGE F. MILES, OF NEW YORK, N. Y.

WIND AND RAIN SHIELD.

1,416,112.  Specification of Letters Patent.  Patented May 16, 1922.

Application filed October 28, 1920. Serial No. 420,084.

*To all whom it may concern:*

Be it known that I, GEORGE F. MILES, a citizen of the United States of America, residing at New York, N. Y., have invented a new and useful Wind and Rain Shield, of which the following is a specification.

My invention relates to improvements in wind shields, so called, which are of particular utility when associated with automobiles or other vehicles.

The object of the invention, broadly speaking, is to provide a shield which will have a protected opening to afford a range of clear unobstructed vision during a storm, the construction being such as to create an artificial draft across the line of vision so as to prevent snow or rain from blowing in through the clear vision opening.

In the accompanying drawings I have shown my invention as applied to the front of an automobile, in which drawings—

Figure 1:
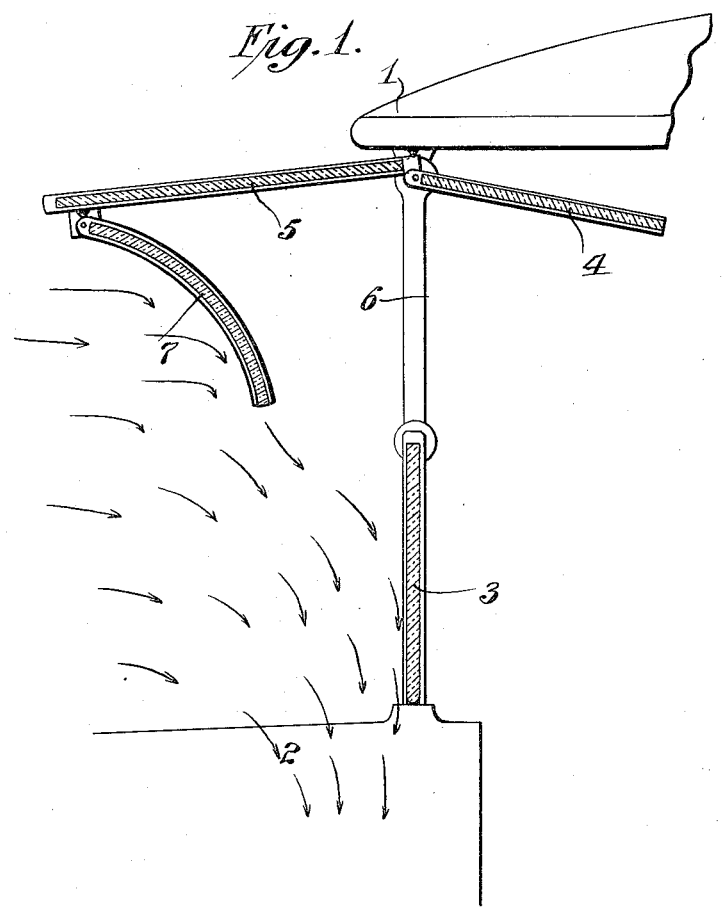
Figure 2:
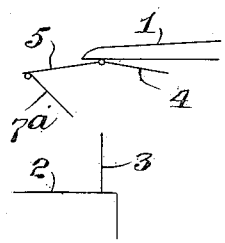
Figure 3:
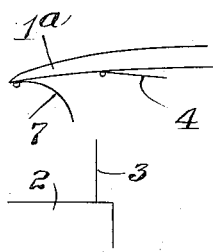
Figure 4:
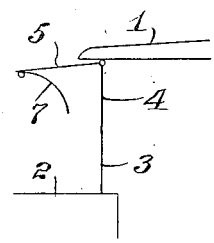

Figure 1 is a side elevation, partly in section, of such parts as are essential to a clear understanding of my apparatus in one preferred form; and Figs. 2, 3 and 4 are diagrammatic views.

1 represents the forward end of the conventional automobile top, 2 represents conventionally the cowl and dashboard portion of the vehicle body. 3 represents the lower section of a conventional wind shield. 4 represents the upper section of the conventional wind shield, which is usually hinged at its upper edge so as to permit the same to be opened to permit ventilation. 5 represents a forwardly projecting secondary upper shield section or shade. This section is suitably secured to the upper part of the wind shield support 6, so that it may be readily removed, if desired, or adjusted to any desired position, any suitable means being provided to lock said shield in its adjusted position. 7 represents the deflector proper. This deflector is suitably connected to the upper section by any suitable joint which will permit said deflector to hang downwardly from said section and incline rearwardly. This joint is also preferably such as will permit the said shield to be adjusted to the desired angle or, if desired, be removed. This shield, in the form shown in Fig. 1, is curved.

In the operation of the apparatus thus far described and shown in Fig. 1, assuming clear vision is desired during a snow or rain storm, the upper wind shield section 4 (when present) is moved to a position to leave an opening above the lower section 3. The upper section 5 is then swung outwardly and the deflector 7 is swung downwardly and is adjusted so that its lower edge will be in advance of the lower wind shield section 3 and sufficiently above the plane of the upper edge of the latter to permit the driver to see through the open space thus afforded. The effect of the wind driving against the deflector 7 will be sufficient to create a powerful downward current of air in the direction of the arrows. This current being directed downward and across the line of vision, co-acts with the force of gravity and drives the rain or snow in a downward direction across the line of vision, without permitting said rain or snow to drive through the clear vision opening. I have found that by this arrangement an interior compartment thus protected is kept free from rain and snow, and that a remarkably clear line of vision is afforded.

In the modification shown in Fig. 2 the arrangement is the same as in Fig. 1, excepting that the deflector section 7ª is flat instead of curved in cross section.

In the modification shown in Fig. 3 the vehicle top 1ª is extended forward so as to take the place of the upper section 5, and in this case the deflector 7 (corresponding to the construction shown in Fig. 1) is hung from the forward under side of the said top.

In Fig. 4 I have shown a construction corresponding to Fig. 1, except that in this figure the upper wind shield section 4 is shown in the closed position.

While more satisfactory results are attained by the use of a curved deflector 7, such as shown in Figs. 1, 3 and 4, I do not wish to be limited thereto in all cases.

It is obvious that this invention is applicable to vehicles of all kinds, including locomotives, automobiles, trolley cars, motor boats, etc., and it may also be utilized wherever it is desired to protect a compartment, such as a signal tower or station, and from which it is desirable to have an opening which will afford a clear line of vision in the event of a storm.

The upper shield 5 and deflector 7 may be made of any suitable material. In the preferred construction, the shield 5 is made of colored glass, which will tend to afford the proper protection from the rays of the sun, and the body of the deflector 7 is made of clear glass.

The various sections of glass may be reinforced in any desired way along their edges, to afford resistance to fracture.

What I claim is:

1. In a device of the character described, a transparent windshield including a lower section and a movable upper section arranged to project forwardly of the former, a deflector arranged in front of said lower section and suspended from and below the forward part of said upper section and inclining downwardly and rearwardly therefrom and toward said lower section and adjustable to terminate in a plane below and to the rear edge of the upper section and above and in front of the upper edge of said lower section to afford an open space for unobstructed vision.

2. In a clear vision device for windshields, a transparent lower section, a deflector element, means for suspending the same at its upper edge from an overhead support and in front of said lower section, said deflector extending downwardly and rearwardly from its line of support and terminating in a plane above and in front of the upper edge of said lower section to afford an open space for unobstructed vision.

3. In a clear vision device for windshields, a transparent lower section, a deflector element, means for suspending the same at its upper edge from an overhead support and in front of said lower section, said deflector extending downwardly and rearwardly from its line of support and terminating in a plane above and in front of the upper edge of said lower section to afford an open space for unobstructed vision, said deflector supporting means including a shield element arranged to extend forwardly of a vertical plane intersecting the lower windshield section.

4. In a clear vision device for windshields, a transparent lower section, an upper section suspended from its upper edge and arranged to swing forwardly of said lower section, a deflector adjustably connected at its upper edge to said upper windshield section and arranged to hang downwardly and rearwardly therefrom, said deflector being wholly below said upper section when the latter is swung forwardly.

GEORGE F. MILES.